US012354554B2

(12) United States Patent
Kong et al.

(10) Patent No.: US 12,354,554 B2
(45) Date of Patent: Jul. 8, 2025

(54) PULSE WIDTH MODULATION METHOD, PULSE WIDTH MODULATION MODULE, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yakun Kong, Beijing (CN); Lian Xiang, Beijing (CN); Gong Chen, Beijing (CN); Jiaxiang Zhang, Beijing (CN); Hongjin Hu, Beijing (CN); Bin Zhang, Beijing (CN); Seungyong Oh, Beijing (CN)

(73) Assignees: CHENGDU BOE OPTOELECTRONICS TECCHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/547,412

(22) PCT Filed: Oct. 12, 2022

(86) PCT No.: PCT/CN2022/124827

§ 371 (c)(1),
(2) Date: Aug. 22, 2023

(87) PCT Pub. No.: WO2024/077517

PCT Pub. Date: Apr. 18, 2024

(65) Prior Publication Data

US 2025/0014518 A1 Jan. 9, 2025

(51) Int. Cl.

*G09G 3/3258* (2016.01)
*G09G 3/32* (2016.01)

(52) U.S. Cl.

CPC ............ *G09G 3/3258* (2013.01); *G09G 3/32* (2013.01); *G09G 2320/0233* (2013.01); *G09G 2320/0247* (2013.01); *G09G 2320/064* (2013.01)

(58) Field of Classification Search

CPC ..... G09G 2320/064; G09G 2320/0233; G09G 2320/0626; G09G 2320/0247;
(Continued)

(56) References Cited

U.S. PATENT DOCUMENTS

2002/0036636 A1 3/2002 Yanagi et al.
2015/0029238 A1 1/2015 Kanda et al.
(Continued)

FOREIGN PATENT DOCUMENTS

CN 1339934 A 3/2002
CN 113241033 A 8/2021
(Continued)

*Primary Examiner* — Dong Hui Liang
(74) *Attorney, Agent, or Firm* — MUNCY, GEISSLER, OLDS & LOWE, P.C.

(57) ABSTRACT

The present disclosure provides a pulse width modulation method, a pulse width modulation module and a display device. A display panel includes a pixel circuitry configured to receive a light-emission control signal and control a light-emitting element to emit light under the control of the light-emission control signal, and a display period includes a refresh frame and a maintenance frame. The pulse width modulation method includes: increasing at least one active pulse width of the light-emission control signal within the refresh frame so that the at least one active pulse width of the light-emission control signal is larger than a first active pulse width threshold; and/or decreasing at least one active pulse width of the light-emission control signal within the main-
(Continued)

tenance frame so that the at least one active pulse width of the light-emission control signal is less than a second active pulse width threshold.

16 Claims, 4 Drawing Sheets

(58) Field of Classification Search
CPC ... G09G 2320/0646; G09G 2320/0242; G09G 3/32; G09G 3/3233; G09G 3/2014; G09G 3/3406; G09G 3/36; G09G 3/3648; G09G 3/3266; G09G 3/22; G09G 3/3413; G09G 3/3225; G09G 3/3208; G09G 3/2022; G09G 2310/08; G09G 2310/0286; G09G 2310/027; G09G 2330/021; G09G 2300/0861; G09G 2300/0842; G09G 2300/0819; G09G 2300/0426; G09G 2360/16
See application file for complete search history.

(56) References Cited

U.S. PATENT DOCUMENTS

| | | | | |
|---|---|---|---|---|
| 2022/0101785 | A1* | 3/2022 | Chung | G09G 3/3208 |
| 2023/0335045 | A1* | 10/2023 | Hu | G09G 3/32 |

FOREIGN PATENT DOCUMENTS

| | | | |
|---|---|---|---|
| CN | 114093330 | A | 2/2022 |
| CN | 114255707 | A | 3/2022 |
| CN | 114882831 | A | 8/2022 |

* cited by examiner

PULSE WIDTH MODULATION METHOD, PULSE WIDTH MODULATION MODULE, AND DISPLAY DEVICE

CROSS REFERENCE TO RELATED APPLICATIONS

This application is the U.S. national phase of PCT Application No. PCT/CN2022/124827 filed on Oct. 12, 2022, the entire contents of which are hereby incorporated by reference.

TECHNICAL FIELD

The present disclosure relates to the field of display technology, in particular to a pulse width modulation method, a pulse width modulation module, and a display device.

BACKGROUND

In a conventional display panel, usually active pulse widths of light-emission control signals are the same. However, due to Thin Film Transistors (TFTs) and timing configuration, it is impossible to ensure brightness uniformity of the display panel, and thereby such a phenomenon as flicker occurs due to a large brightness difference.

SUMMARY

In one aspect, the present disclosure provides in some embodiments a pulse width modulation method for a display panel. The display panel includes a pixel circuitry configured to receive a light-emission control signal and control a light-emitting element to emit light under the control of the light-emission control signal, and a display period includes a refresh frame and a maintenance frame. The pulse width modulation method includes: increasing at least one active pulse width of the light-emission control signal within the refresh frame so that the at least one active pulse width of the light-emission control signal is larger than a first active pulse width threshold; and/or decreasing at least one active pulse width of the light-emission control signal within the maintenance frame so that the at least one active pulse width of the light-emission control signal is less than a second active pulse width threshold.

In a possible embodiment of the present disclosure, the increasing the at least one active pulse width of the light-emission control signal within the refresh frame includes: increasing at least one active pulse width in every at least two adjacent active pulse widths of the light-emission control signal within the refresh frame so that the at least one active pulse width in the at least two adjacent active pulse widths is larger than the first active pulse width threshold.

In a possible embodiment of the present disclosure, the increasing the at least one active pulse width of the light-emission control signal within the refresh frame includes increasing all active pulse widths of the light-emission control signal within the refresh frame so that all the active pulse widths of the light-emission control signal are larger than the first active pulse width threshold.

In a possible embodiment of the present disclosure, the decreasing the at least one active pulse width of the light-emission control signal within the maintenance frame includes decreasing at least one active pulse width in every at least two adjacent active pulse widths of the light-emission control signal so that the at least one active pulse width in the at least two adjacent active pulse widths is less than the second active pulse width threshold.

In a possible embodiment of the present disclosure, the decreasing the at least one active pulse width of the light-emission control signal within the maintenance frame includes decreasing all active pulse widths of the light-emission control signal so that all the active pulse widths of the light-emission control signal are less than the second active pulse width threshold.

In a possible embodiment of the present disclosure, the pulse width modulation method includes, after a display refresh rate of the display panel decreases from a first refresh rate to a second refresh rate, increasing at least one active pulse width of the light-emission control signal within first N frames so that the at least one active pulse width of the light-emission control signal is larger than a third active pulse width threshold within the first N frames, where N is a positive integer.

In a possible embodiment of the present disclosure, the increasing the at least one active pulse width of the light-emission control signal within the first N frames includes increasing at least one active pulse width in every at least two adjacent active pulse widths of the light-emission control signal within the first N frames so that the at least one active pulse width in the at least two adjacent active pulse widths is larger than the third active pulse width threshold.

In a possible embodiment of the present disclosure, the increasing the at least one active pulse width of the light-emission control signal within the first N frames includes increasing all active pulse widths of the light-emission control signal within the first N frames so that all the active pulse widths of the light-emission control signal are larger than the third active pulse width threshold within the first N frames.

In a possible embodiment of the present disclosure, the pulse width modulation method further includes, after the display refresh rate of the display panel decreases from the first refresh rate to the second refresh rate, restoring the active pulse width of the light-emission control signal into a predefined pulse width after the first N frames.

In another aspect, the present disclosure provides in some embodiments a pulse width modulation module for a display panel. The display panel includes a pixel circuitry configured to receive a light-emission control signal and control a light-emitting element to emit light under the control of the light-emission control signal, and a display period includes a refresh frame and a maintenance frame. The pulse width modulation module includes a pulse width modulation circuitry configured to: increase at least one active pulse width of the light-emission control signal within the refresh frame so that the at least one active pulse width of the light-emission control signal is larger than a first active pulse width threshold; and/or decrease the at least one active pulse width of the light-emission control signal within the maintenance frame so that the at least one active pulse width of the light-emission control signal is less than a second active pulse width threshold.

In a possible embodiment of the present disclosure, when increasing the at least one active pulse width of the light-emission control signal within the refresh frame, the pulse width modulation circuitry is specifically configured to increase at least one active pulse width in every at least two adjacent active pulse widths of the light-emission control signal within the refresh frame so that the at least one active pulse width in the at least two adjacent active pulse widths is larger than the first active pulse width threshold.

In a possible embodiment of the present disclosure, when increasing at least one active pulse width of the light-emission control signal within the refresh frame, the pulse width modulation circuitry is specifically configured to increase all active pulse widths of the light-emission control signal within the refresh frame so that all the active pulse widths of the light-emission control signal are larger than the first active pulse width threshold.

In a possible embodiment of the present disclosure, when decreasing the at least one active pulse width of the light-emission control signal within the maintenance frame, the pulse width modulation circuitry is specifically configured to decrease at least one active pulse width in every at least two adjacent active pulse widths of the light-emission control signal within the maintenance frame so that the at least one active pulse width of the at least two adjacent active pulse widths is less than the second active pulse width threshold.

In a possible embodiment of the present disclosure, when decreasing the at least one active pulse width of the light-emission control signal, the pulse width modulation circuitry is specifically configured to decrease all active pulse widths of the light-emission control signal within the maintenance frame so that all the active pulse widths of the light-emission control signal are less than the second active pulse width threshold.

In a possible embodiment of the present disclosure, the pulse width modulation module is further configured to, after a display refresh rate of the display panel decreases from a first refresh rate to a second refresh rate, increase at least one active pulse width of the light-emission control signal within first N frames so that the at least one active pulse width of the light-emission control signal is larger than a third active pulse width threshold within the first N frames, where N is a positive integer.

In a possible embodiment of the present disclosure, when increasing the at least one active pulse width of the light-emission control signal within the first N frames after the display refresh rate of the display panel decreases from the first refresh rate to the second refresh rate, the pulse width modulation module is specifically configured to increase at least one active pulse width in every at least two adjacent active pulse widths of the light-emission control signal within the first N frames so that the at least one active pulse width in the at least two adjacent active pulse widths is larger than the third active pulse width threshold.

In a possible embodiment of the present disclosure, when increasing the at least one active pulse width of the light-emission control signal within the first N frames after the display refresh rate of the display panel decreases from the first refresh rate to the second refresh rate, the pulse width modulation module is specifically configured to increase all active pulse widths of the light-emission control signal within the first N frames so that all the active pulse widths of the light-emission control signal are larger than the third active pulse width threshold within the first N frames.

In a possible embodiment of the present disclosure, the pulse width modulation module is further configured to, after the display refresh rate of the display panel decreases from the first refresh rate to the second refresh rate, restore the active pulse width of the light-emission control signal into a predefined pulse width after the first N frames.

In yet another aspect, the present disclosure provides in some embodiments a display device including the above-mentioned pulse width modulation module.

DETAILED DESCRIPTION

Figure 1:
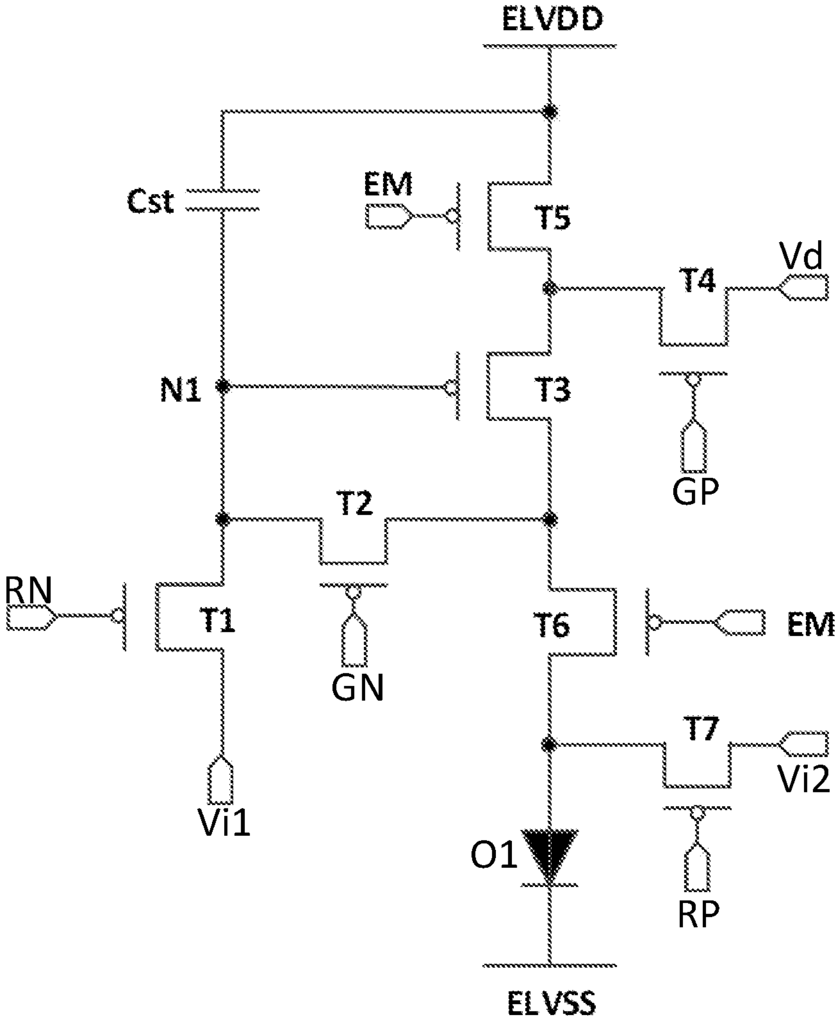
FIG. 1 is a circuit diagram of a pixel circuitry in a display panel according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be TFTs, field effect transistors (FETs) or any other elements having an identical characteristic. In order to differentiate two electrodes other than a gate electrode from each other, one of the two electrodes is called as first electrode and the other is called as second electrode.

In actual use, the first electrode may be a drain electrode while the second electrode may be a source electrode, or the first electrode may be a source electrode while the second electrode may be a drain electrode.

The present disclosure provides in some embodiments a pulse width modulation method for a display panel. The display panel includes a pixel circuitry configured to receive a light-emission control signal and control a light-emitting element to emit light under the control of the light-emission control signal, and a display period includes a refresh frame and a maintenance frame. The pulse width modulation method includes: increasing at least one active pulse width of the light-emission control signal within the refresh frame so that the at least one active pulse width of the light-emission control signal is larger than a first active pulse width threshold; and/or, decreasing at least one active pulse width of the light-emission control signal within the maintenance frame so that the at least one active pulse width of the light-emission control signal is less than a second active pulse width threshold.

According to the embodiments of the present disclosure, the at least one active pulse width of the light-emission control signal is adjusted within the refresh frame so that the at least one active pulse width of the light-emission control signal is larger than the first active pulse width threshold, and/or the at least one active pulse width of the light-emission control signal is adjusted within the maintenance frame so that the at least one active pulse width of the light-emission control signal is less than the second active pulse width threshold. As a result, a brightness value of the light-emitting element within the refresh frame is substantially equal to that of the light-emitting element within the maintenance frame, so it is able to prevent the occurrence of such a phenomenon as flicker.

In at least one embodiment of the present disclosure, when the brightness value of the light-emitting element within the refresh frame is substantially equal to that of the light-emitting element within the maintenance frame, it means that the brightness value of the light-emitting element within the refresh frame is equal to that of the light-emitting element within the maintenance frame, or an absolute value of a difference between the brightness value of the light-emitting element within the refresh frame and that of the light-emitting element within the maintenance frame is less than a predefined value. The predefined value is larger than 0, and it may be set according to the practical need.

In the pulse width modulation method according to the embodiments of the present disclosure, the at least one active pulse width of the light-emission control signal is adjusted within the refresh frame, and/or the at least one active pulse width of the light-emission control signal is adjusted within the maintenance frame, so that the brightness value of the light-emitting element within the refresh frame is substantially equal to that within the maintenance frame.

During the implementation, during the display at a low frequency, the display period includes a refresh frame and at least one maintenance frame arranged after the refresh frame. For example, when the display refresh rate of the display panel is less than or equal to 40 Hz, the display panel displays an image at a low frequency.

In at least one embodiment of the present disclosure, the active pulse width of the light-emission control signal refers to a time period in which a potential of the light-emission control signal is continuously an active voltage. For example, the active voltage is a low voltage when a transistor controlled by the light-emission control signal is a p-type transistor, and the active voltage is a high voltage when the transistor controlled by the light-emission control signal is an n-type transistor.

In at least one embodiment of the present disclosure, as shown in FIG. 1, the pixel circuitry in the display panel includes a first transistor T1, a second transistor T2, a third transistor T3, a fourth transistor T4, a fifth transistor T5, a sixth transistor T6, a seventh transistor T7, a storage capacitor Cst and an organic light-emitting diode O1.

A gate electrode of T1 is electrically coupled to a first reset line RN, a gate electrode of T2 is electrically coupled to a first scanning line GN, T3 is a driving transistor, a gate electrode of T4 is electrically coupled to a second scanning line GP, a gate electrode of T5 and a gate electrode of T6 are electrically coupled to a light-emission control line EM, and a gate electrode of T7 is electrically coupled to a second reset line RP.

The light-emission control line EM is configured to provide the light-emission control signal. T5 is a first light-emission control transistor, and T6 is a second light-emission control transistor.

In the pixel circuitry in FIGS. 1, T5 and T6 are p-type transistors and the active voltage is a low voltage.

In FIG. 1, all the transistors are, but not limited to, p-type transistors.

In FIG. 1, ELVDD is a power supply voltage end, Vd is a data voltage, N1 is a first node, Vi1 is a first initial voltage, Vi2 is a second initial voltage, and ELVSS is a low voltage end.

Figure 2:
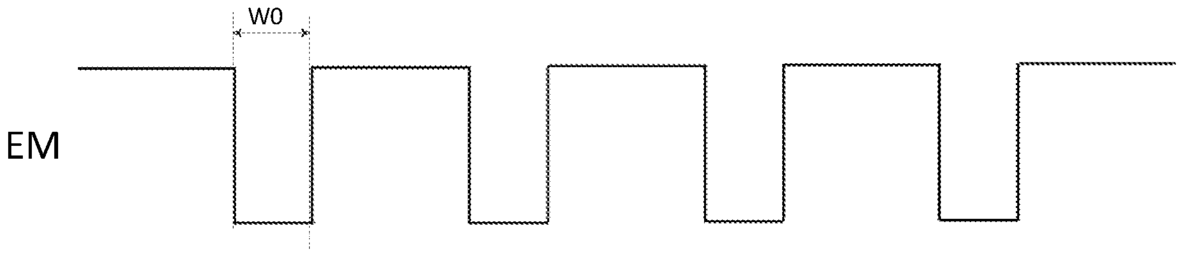
FIG. 2 is a waveform diagram of a light-emission control signal from a light-emission control line EM in the related art.

As shown in FIG. 2, in the related art, the active pulse width of the light-emission control signal from the light-emission control line EM is a predefined pulse width W0.

During the implementation, the at least one active pulse width of the light-emission control signal is increased within the refresh frame so that the at least one active pulse width of the light-emission control signal is larger than the first active pulse width threshold within the refresh frame. In this way, it is able to control the brightness value of the light-emitting element within the refresh rate to be approximately equal to that within the maintenance frame.

During the implementation, the first active pulse width threshold is larger than or equal to the predefined pulse width.

In the related art, the active pulse width of the light-emission control signal is the same within both the refresh frame and the maintenance frame. During the display at a low frequency, the brightness value is low within the refresh frame and high within the maintenance frame, resulting in such a phenomenon as flicker. According to the embodiments of the present disclosure, the at least one active pulse width of the light-emission control signal is increased within the refresh rate, so as to prevent the occurrence of flicker.

Figure 3:
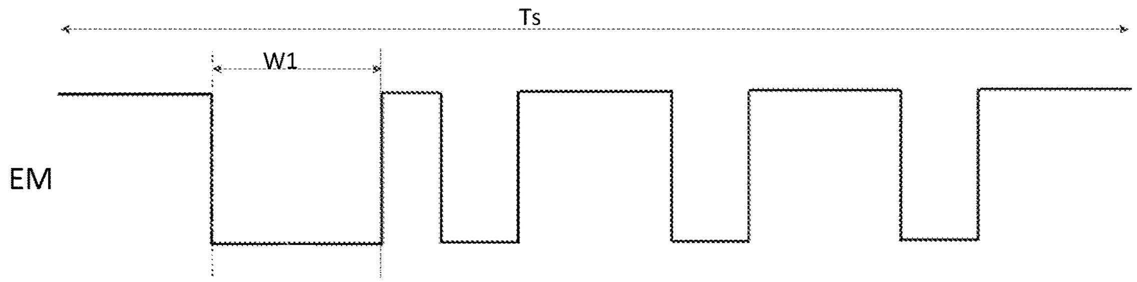
FIG. 3 is a waveform diagram of a light-emission control signal according to one embodiment of the present disclosure.

As shown in FIG. 3, a first active pulse width W1 of the light-emission control signal from EM is increased within the refresh frame Ts so that the first active pulse width W1 of the light-emission control signal is larger than the first active pulse width threshold.

During the implementation, within the refresh frame, only one active pulse width of the light-emission control signal is increased, or at least one active pulse width in every at least two adjacent active pulse widths of the light-emission control signal is increased, or all active pulse widths of the light-emission control signal are increased.

In a possible embodiment of the present disclosure, the increasing the at least one active pulse width of the light-emission control signal within the refresh frame includes increasing at least one active pulse width in every at least two adjacent active pulse widths of the light-emission control signal within the refresh frame so that the at least one active pulse width of the at least two adjacent active pulse widths is larger than the first active pulse width threshold.

In a possible embodiment of the present disclosure, the increasing the at least one active pulse width of the light-emission control signal within the refresh frame includes increasing all active pulse widths of the light-emission control signal within the refresh frame so that all the active pulse widths of the light-emission control signal are larger than the first active pulse width threshold within the refresh frame.

Figure 4:
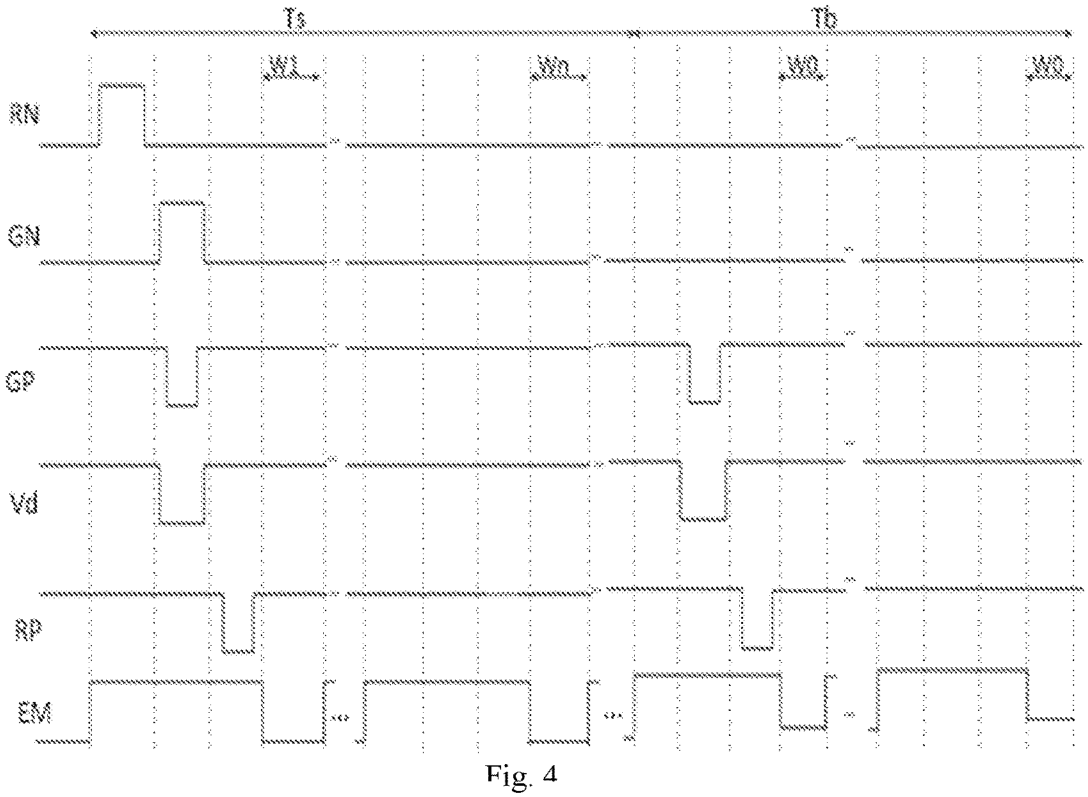
FIG. 4 is a sequence diagram of the pixel circuitry shown in FIG. 1.

FIG. 4 is a sequence diagram of the pixel circuitry in FIG. 1.

In FIG. 4, Ts is the refresh frame, and Tb is the maintenance frame.

As shown in FIG. 4, within the refresh frame Ts, the first active pulse width W1 of the light-emission control signal from EM is larger than the first active pulse width threshold, and an $n^{th}$ active pulse width Wn of the light-emission control signal from EM is larger than the first active pulse width threshold, where N is a positive integer larger than 1. Within the maintenance frame Tb, the active pulse width of the light-emission control signal from EM is the predefined pulse width W0.

In FIG. 4, the first active pulse width threshold is, but not limited to, the predefined pulse width W0, W1 is larger than W0, and Wn is larger than W0.

In at least one embodiment of the present disclosure, the first active pulse width threshold is the predefined pulse width, or larger than the predefined pulse width.

During the implementation, the at least one active pulse width of the light-emission control signal is increased within the maintenance frame so that the at least one active pulse width of the light-emission control signal is less than the second active pulse width threshold within the maintenance frame. In this way, it is able to control the brightness value of the light-emitting element within the refresh frame to be approximately equal to that within the maintenance frame.

During the implementation, the second active pulse width threshold is less than or equal to the predefined pulse width.

In the related art, within both the refresh frame and the maintenance frame, the active pulse width of the light-emission control signal is the same. During the display at a low frequency, the brightness value is low within the refresh frame and high within the maintenance frame, resulting in such a phenomenon as flicker. According to the embodiments of the present disclosure, the at least one active pulse width of the light-emission control signal is decreased within the maintenance frame, so as to prevent the occurrence of flicker.

Figure 5:
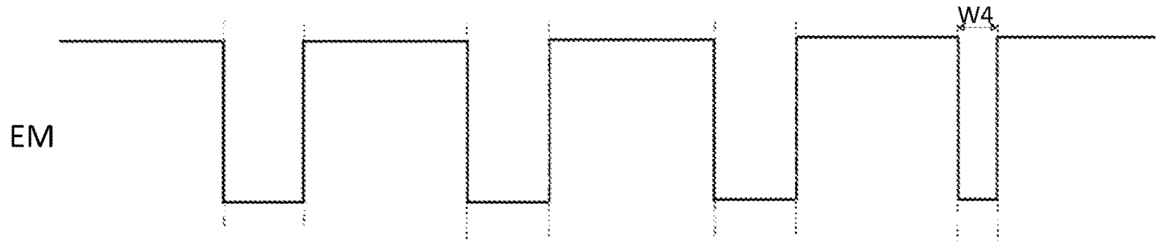
FIG. 5 is another waveform diagram of the light-emission control signal according to one embodiment of the present disclosure.

As shown in FIG. 5, a fourth active pulse width W4 of the light-emission control signal from EM is increased within the refresh frame Ts so that the fourth active pulse width W4 of the light-emission control signal is less than the second active pulse width threshold.

During the implementation, within the maintenance frame, only one active pulse width of the light-emission control signal is decreased, or at least one active pulse width in every at least two adjacent active pulse widths of the light-emission control signal is decreased, or all active pulse widths of the light-emission control signal are decreased.

In a possible embodiment of the present disclosure, the decreasing the at least one active pulse width of the light-emission control signal within the maintenance frame includes decreasing at least one active pulse width in every at least two adjacent active pulse widths of the light-emission control signal within the maintenance frame so that the at least one active pulse width in the at least two adjacent active pulse widths is less than the second active pulse width threshold within the maintenance frame.

In a possible embodiment of the present disclosure, the decreasing the at least one active pulse width of the light-emission control signal within the maintenance frame includes decreasing all active pulse widths of the light-emission control signal within the maintenance frame so that all the active pulse widths of the light-emission control signal are less than the second active pulse width threshold within the maintenance frame.

Figure 6:
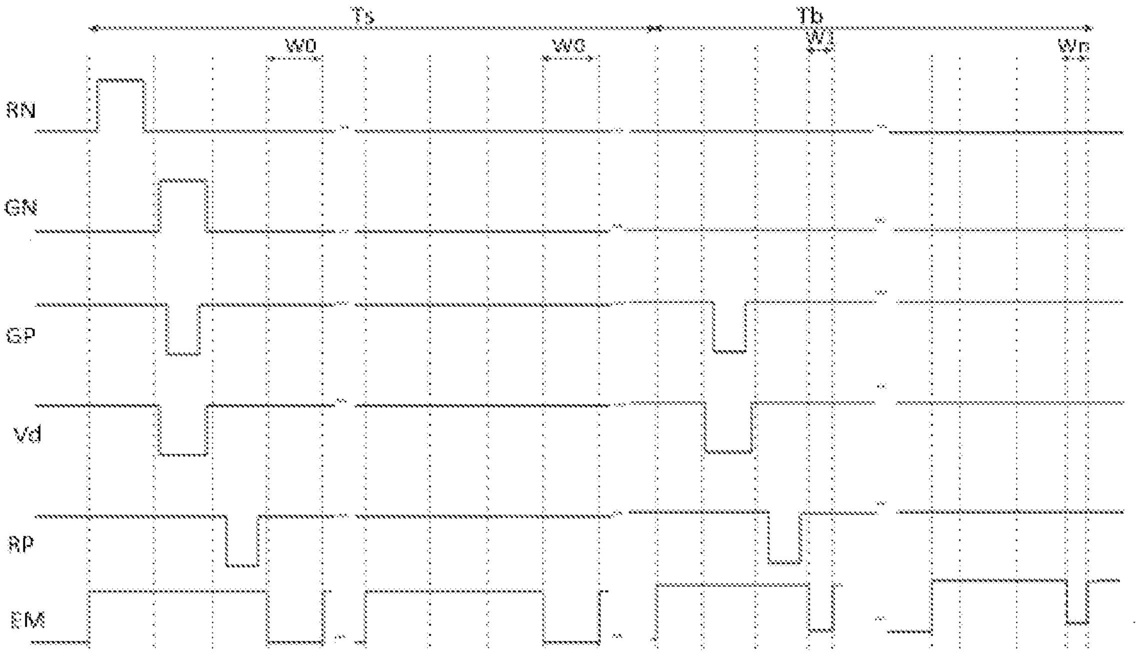
FIG. 6 is another sequence diagram of the pixel circuitry in FIG. 1.

FIG. 6 is a sequence diagram of the pixel circuitry shown in FIG. 1.

In FIG. 6, Ts is the refresh frame, and Tb is the maintenance frame.

As shown in FIG. 6, within the maintenance frame Tb, the first active pulse width W1 of the light-emission control signal from EM is less than the second active pulse width threshold, and the $n^{th}$ active pulse width Wn of the light-emission control signal from EM is less than the second active pulse width threshold. Within the refresh frame Ts, the active pulse width of the light-emission control signal from EM is the predefined pulse width W0.

In FIG. 6, the first active pulse width threshold is, but not limited to, the predefined pulse width W0, W1 is less than W0 and Wn is less than W0.

In at least one embodiment of the present disclosure, the second active pulse width threshold is the predefined pulse width, or less than the predefined pulse width.

In the embodiments of the present disclosure, the light-emission control signal is provided with multiple active pulse widths, and offset adjustment is performed on the active pulse widths of the light-emission control signal within different frames, so as to realize the flicker optimization, and ensure the brightness uniformity, thereby to prevent the occurrence of flicker at a low frequency.

In at least one embodiment of the present disclosure, the active pulse width of the light-emission control signal is adjusted within a range of about ±30%, so as to ensure the brightness uniformity and visibly prevent the occurrence of flicker.

When the adjustment range of the active pulse width of the light-emission control signal is about ±30%, it means that, when the active pulse width of the light-emission control signal needs to be decreased, the active pulse width of the light-emission control signal is about 0.7 time of W0, and when the active pulse width of the light-emission control signal needs to be increased, the active pulse width of the light-emission control signal is about 1.3 times of W0, where W0 is the predefined pulse width.

Figure 7:
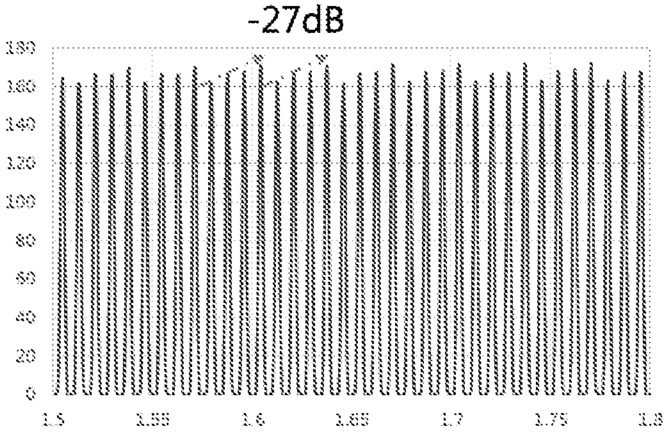
FIG. 7 is a curve diagram of brightness of the display panel with a display refresh rate of 10 Hz before the use of a pulse width modulation method.
Figure 8:
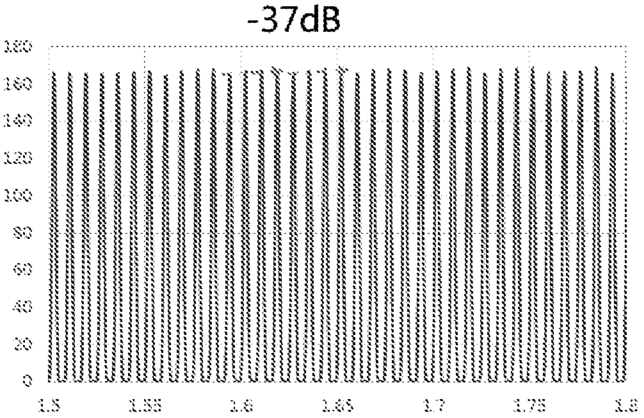
FIG. 8 is a curve diagram of the brightness of the display panel with the display refresh rate of 10 Hz after the use of a pulse width modulation method.

FIG. 7 shows a brightness curve of the display panel with a refresh rate of 10 Hz before the use of the pulse width modulation method, and FIG. 8 shows a brightness curve of the display panel with the refresh rate of 10 Hz after the use of the pulse width modulation method.

In FIGS. 7 and 8, a horizontal axis represents time t in second and a vertical axis represents brightness in nit.

Through comparing FIG. 7 with FIG. 8, a flicker effect is increased from −27 dB to −37 dB when the pulse width modulation method in the embodiments of the present disclosure is adopted.

In at least one embodiment of the present disclosure, the pulse width modulation method further includes, after a display refresh rate of the display panel decreases from a first refresh rate to a second refresh rate, increasing at least one active pulse width of the light-emission control signal within first N frames so that the at least one active pulse width of the light-emission control signal is larger than a third active pulse width threshold within the first N frames, where N is a positive integer.

In a possible embodiment of the present disclosure, the third active pulse width threshold is the predefined pulse width, or greater than the active pulse width.

In the related art, image quality and a refresh rate are highly demanded by an OLED display module. However, the high refresh rate leads to high power consumption, so the high refresh rate is switched to the low refresh rate if necessary, so as to reduce the power consumption. During the switching of the refresh rate, flicker occurs inevitably. According to the embodiments of the present disclosure, after the display refresh rate of the display panel decreases from the first refresh rate to the second refresh rate, the at least one active pulse width of the light-emission control signal is increased within the first N frames, so as to prevent the occurrence of flicker.

During the implementation, after the display refresh rate of the display panel decreases from the first refresh rate to the second refresh rate, only one active pulse width of the light-emission control signal is increased within the first N frame time, or at least one active pulse width in every at least two adjacent active pulse widths of the light-emission control signal is increased, or all active pulse widths of the light-emission control signal are increased.

In a possible embodiment of the present disclosure, the increasing the at least one active pulse width of the light-emission control signal within the first N frames includes increasing at least one active pulse width in every at least two adjacent active pulse widths of the light-emission control signal within the first N frames so that the at least one active pulse width of the at least two adjacent active pulse widths is larger than the third active pulse width threshold within the first N frames.

In a possible embodiment of the present disclosure, the increasing the at least one active pulse width of the light-emission control signal within the first N frames includes increasing all active pulse widths of the light-emission control signal within the first N frames so that all the active pulse widths of the light-emission control signal are larger than the third active pulse width threshold within the first N frames.

The pulse width modulation method further includes, after the display refresh rate of the display panel decreases from the first refresh rate to the second refresh rate, restoring the active pulse width of the light-emission control signal into the predefined pulse width after the first N frames.

Figure 9:
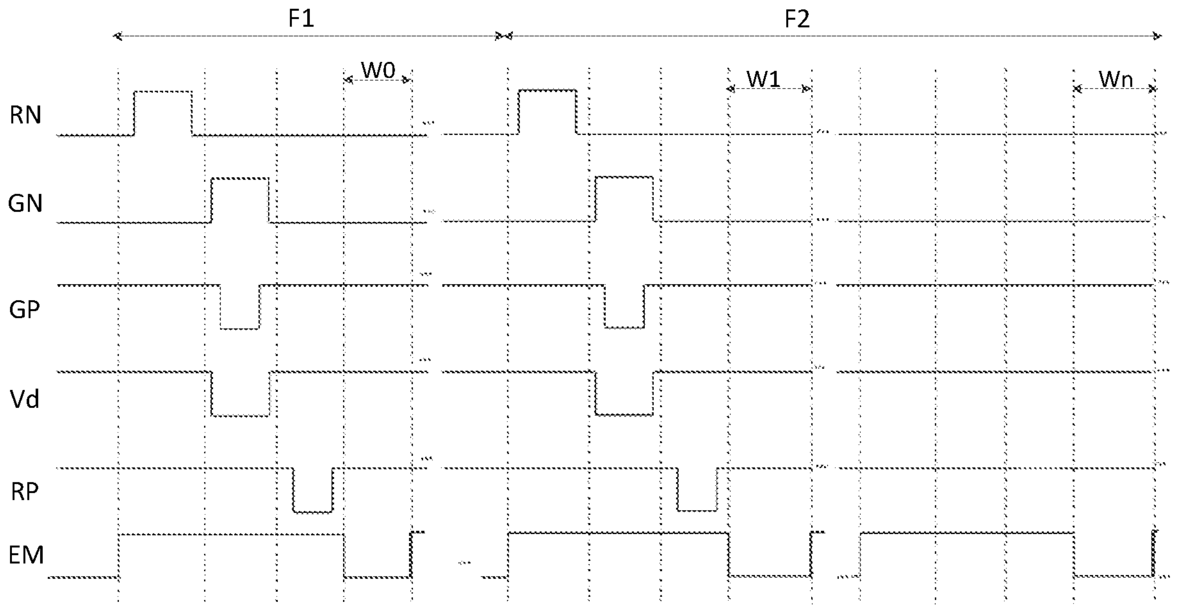
FIG. 9 is yet another sequence diagram of the pixel circuitry in FIG. 1.

FIG. 9 is a sequence diagram of the pixel circuitry in FIG. 1.

As shown in FIG. 9, within a first display period F1, the display refresh rate of the display panel is 120 Hz, and within a second display period F2, the display refresh rate of the display panel is 10 Hz. Within the first display period F1, the active pulse width of the light-emission control signal is the predefined pulse width W0. Within the second display period F2, the first active pulse width W1 of the light-emission control signal is larger than the third active pulse width threshold, and the $n^{th}$ active pulse width Wn of the light-emission control signal is larger than the third active pulse width threshold.

In FIG. 9, the first display period F1 includes at least one frame and the second display period F2 includes, but limited to, one frame. In actual use, the second display period F2 also includes at least one frame.

In FIG. 9, n is smaller than N.

In FIG. 9, the third active pulse width threshold is, but not limited to, the predefined pulse width W0. In actual use, the third active pulse width threshold is also larger than the predefined pulse width W0.

During the implementation, when the display refresh rate of the display panel decreases from 120 Hz to 10 Hz, the brightness value decreases within the first refresh frame, and gradually increases within the subsequent maintenance frame. Hence, after the display refresh rate decreases to 10 Hz, the active pulse width of the light-emission control signal is increased within the first fresh frame so that the active pulse width of the light-emission control signal is larger than the third active pulse width threshold. However, in actual use, after the display refresh rate decreases to 10 Hz, at least one active pulse width of the light-emission control signal is increased within at least one of the first several frames.

The present disclosure further provides in some embodiments a pulse width modulation module for a display panel. The display panel includes a pixel circuitry configured to receive a light-emission control signal and control a light-emitting element to emit light under the control of the light-emission control signal, and a display period includes a refresh frame and a maintenance frame. The pulse width modulation module includes a pulse width modulation circuitry configured to: increase at least one active pulse width of the light-emission control signal within the refresh frame so that the at least one active pulse width of the light-emission control signal is larger than a first active pulse width threshold; and/or decrease the at least one active pulse width of the light-emission control signal within the maintenance frame so that the at least one active pulse width of the light-emission control signal is less than a second active pulse width threshold. In this way, a brightness value of the light-emitting element within the refresh frame is substantially equal to that within the maintenance frame, so it is able to prevent the occurrence of flicker.

In a possible embodiment of the present disclosure, the pulse width modulation circuitry is configured to increase at least one active pulse width of the light-emission control signal within the refresh frame so that the at least one active pulse width of the light-emission control signal is larger than the first active pulse width threshold.

During the implementation, when increasing the at least one active pulse width of the light-emission control signal within the refresh frame, the pulse width modulation circuitry is specifically configured to increase at least one active pulse width in every at least two adjacent active pulse widths of the light-emission control signal within the refresh frame so that the at least one active pulse width in the at least two adjacent active pulse widths is larger than the first active pulse width threshold.

During the implementation, when increasing at least one active pulse width of the light-emission control signal within the refresh frame, the pulse width modulation circuitry is specifically configured to increase all active pulse widths of the light-emission control signal within the refresh frame so that all the active pulse widths of the light-emission control signal are larger than the first active pulse width threshold.

In a possible embodiment of the present disclosure, the pulse width modulation circuitry is configured to decrease at least one active pulse width of the light-emission control signal within the maintenance frame so that the at least one active pulse width of the light-emission control signal is less than a second active pulse width threshold.

During the implementation, when decreasing the at least one active pulse width of the light-emission control signal within the maintenance frame, the pulse width modulation circuitry is specifically configured to decrease at least one active pulse width in every at least two adjacent active pulse widths of the light-emission control signal within the maintenance frame so that the at least one active pulse width of the at least two adjacent active pulse widths is less than the second active pulse width threshold.

During the implementation, when decreasing the at least one active pulse width of the light-emission control signal, the pulse width modulation circuitry is specifically configured to decrease all active pulse widths of the light-emission control signal within the maintenance frame so that all the active pulse widths of the light-emission control signal are less than the second active pulse width threshold.

In at least one embodiment of the present disclosure, the pulse width modulation module is further configured to, after a display refresh rate of the display panel decreases from a first refresh rate to a second refresh rate, increase at least one active pulse width of the light-emission control signal within first N frames so that the at least one active pulse width of the light-emission control signal is larger than a third active pulse width threshold within the first N frames, where N is a positive integer.

In at least one embodiment of the present disclosure, the pulse width modulation module is further configured to, after the display refresh rate of the display panel decreases from the first refresh rate to the second refresh rate, restore the active pulse width of the light-emission control signal into the predefined pulse width after the first N frames.

During the implementation, when increasing the at least one active pulse width of the light-emission control signal within the first N frames after the display refresh rate of the display panel decreases from the first refresh rate to the second refresh rate, the pulse width modulation module is specifically configured to increase at least one active pulse width in every at least two adjacent active pulse widths of the light-emission control signal within the first N frames so that the at least one active pulse width in the at least two adjacent active pulse widths is larger than the third active pulse width threshold.

During the implementation, when increasing the at least one active pulse width of the light-emission control signal within the first N frames after the display refresh rate of the display panel decreases from the first refresh rate to the second refresh rate, the pulse width modulation module is specifically configured to increase all active pulse widths of the light-emission control signal within the first N frames so that all the active pulse widths of the light-emission control signal are larger than the third active pulse width threshold within the first N frames.

The present disclosure further provides in some embodiments a display device which includes the above-mentioned pulse width modulation module.

The display device may be any product or member having a display function, e.g., mobile phone, tablet computer, television, laptop computer, digital photo frame or navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pulse width modulation module for a display panel, wherein the display panel comprises a pixel circuitry configured to receive a light-emission control signal and control a light-emitting element to emit light under the control of the light-emission control signal, and a display period comprises a refresh frame and a maintenance frame, wherein the pulse width modulation module comprises a pulse width modulation circuitry configured to:

increase at least one active pulse width of the light-emission control signal within the refresh frame so that the at least one active pulse width of the light-emission control signal is larger than a first active pulse width threshold; and decrease the at least one active pulse width of the light-emission control signal within the maintenance frame so that the at least one active pulse width of the light-emission control signal is less than a second active pulse width threshold, wherein:

when decreasing the at least one active pulse width of the light-emission control signal within the maintenance frame, the pulse width modulation circuitry is specifically configured to decrease at least one active pulse width in every at least two adjacent active pulse widths of the light-emission control signal within the maintenance frame so that the at least one active pulse width of the at least two adjacent active pulse widths is less than the second active pulse width threshold;

or when decreasing the at least one active pulse width of the light-emission control signal, the pulse width modulation circuitry is specifically configured to decrease all active pulse widths of the light-emission control signal within the maintenance frame so that all the active pulse widths of the light-emission control signal are less than the second active pulse width threshold.

2. The pulse width modulation module according to claim 1, wherein the pulse width modulation module is further configured to, after a display refresh rate of the display panel decreases from a first refresh rate to a second refresh rate, increase at least one active pulse width of the light-emission control signal within first N frames so that the at least one active pulse width of the light-emission control signal is larger than a third active pulse width threshold within the first N frames, where N is a positive integer.

3. The pulse width modulation module according to claim 2, wherein when increasing the at least one active pulse width of the light-emission control signal within the first N frames after the display refresh rate of the display panel decreases from the first refresh rate to the second refresh rate, the pulse width modulation module is specifically configured to increase at least one active pulse width in every at least two adjacent active pulse widths of the light-emission control signal within the first N frames so that the at least one active pulse width in the at least two adjacent active pulse widths is larger than the third active pulse width threshold.

4. The pulse width modulation module according to claim 2, wherein when increasing the at least one active pulse width of the light-emission control signal within the first N frames after the display refresh rate of the display panel decreases from the first refresh rate to the second refresh rate, the pulse width modulation module is specifically configured to increase all active pulse widths of the light-emission control signal within the first N frames so that all the active pulse widths of the light-emission control signal are larger than the third active pulse width threshold within the first N frames.

5. The pulse width modulation module according to claim 2, wherein the pulse width modulation module is further configured to, after the display refresh rate of the display panel decreases from the first refresh rate to the second refresh rate, restore the active pulse width of the light-emission control signal into a predefined pulse width after the first N frames.

6. The pulse width modulation module according to claim 1, wherein when increasing the at least one active pulse width of the light-emission control signal within the refresh frame, the pulse width modulation circuitry is specifically configured to increase at least one active pulse width in every at least two adjacent active pulse widths of the light-emission control signal within the refresh frame so that the at least one active pulse width in the at least two adjacent active pulse widths is larger than the first active pulse width threshold.

7. The pulse width modulation module according to claim 1, wherein when increasing at least one active pulse width of the light-emission control signal within the refresh frame, the pulse width modulation circuitry is specifically configured to increase all active pulse widths of the light-emission control signal within the refresh frame so that all the active pulse widths of the light-emission control signal are larger than the first active pulse width threshold.

8. A display device, comprising the pulse width modulation module according to claim 1.

9. A pulse width modulation method for a display panel, wherein the display panel comprises a pixel circuitry configured to receive a light-emission control signal and control a light-emitting element to emit light under the control of the light-emission control signal, and a display period comprises a refresh frame and a maintenance frame, wherein the pulse width modulation method comprises:

increasing at least one active pulse width of the light-emission control signal within the refresh frame so that the at least one active pulse width of the light-emission control signal is larger than a first active pulse width threshold; and decreasing at least one active pulse width of the light-emission control signal within the maintenance frame so that the at least one active pulse width of the light-emission control signal is less than a second active pulse width threshold, wherein:

the decreasing the at least one active pulse width of the light-emission control signal within the maintenance frame comprises decreasing at least one active pulse width in every at least two adjacent active pulse widths of the light-emission control signal so that the at least one active pulse width in the at least two adjacent active pulse widths is less than the second active pulse width threshold;

or the decreasing the at least one active pulse width of the light-emission control signal within the maintenance frame comprises decreasing all active pulse widths of the light-emission control signal so that all the active pulse widths of the light-emission control signal are less than the second active pulse width threshold.

10. The pulse width modulation method according to claim 9, further comprising, after a display refresh rate of the display panel decreases from a first refresh rate to a second refresh rate, increasing at least one active pulse width of the light-emission control signal within first N frames so that the at least one active pulse width of the light-emission control signal is larger than a third active pulse width threshold within the first N frames, where N is a positive integer.

11. The pulse width modulation method according to claim 10, wherein the increasing the at least one active pulse width of the light-emission control signal within the first N frames comprises increasing at least one active pulse width in every at least two adjacent active pulse widths of the light-emission control signal within the first N frames so that the at least one active pulse width in the at least two adjacent active pulse widths is larger than the third active pulse width threshold.

12. The pulse width modulation method according to claim 10, wherein the increasing the at least one active pulse width of the light-emission control signal within the first N frames comprises increasing all active pulse widths of the light-emission control signal within the first N frames so that all the active pulse widths of the light-emission control signal are larger than the third active pulse width threshold within the first N frames.

13. The pulse width modulation method according to claim 10, further comprising, after the display refresh rate of the display panel decreases from the first refresh rate to the second refresh rate, restoring the active pulse width of the light-emission control signal into a predefined pulse width after the first N frames.

14. The pulse width modulation method according to claim 9, wherein the increasing the at least one active pulse width of the light-emission control signal within the refresh frame comprises increasing at least one active pulse width in every at least two adjacent active pulse widths of the light-emission control signal within the refresh frame so that the at least one active pulse width in the at least two adjacent active pulse widths is larger than the first active pulse width threshold.

15. The pulse width modulation method according to claim 14, further comprising, after a display refresh rate of the display panel decreases from a first refresh rate to a second refresh rate, increasing at least one active pulse width of the light-emission control signal within first N frames so that the at least one active pulse width of the light-emission control signal is larger than a third active pulse width threshold within the first N frames, where N is a positive integer.

16. The pulse width modulation method according to claim 9, wherein the increasing the at least one active pulse width of the light-emission control signal within the refresh frame comprises increasing all active pulse widths of the light-emission control signal within the refresh frame so that all the active pulse widths of the light-emission control signal are larger than the first active pulse width threshold.

* * * * *